United States Patent
Anbil et al.

[11] Patent Number: 6,035,277
[45] Date of Patent: *Mar. 7, 2000

[54] APPROXIMATION METHOD FOR EFFICIENT RESOURCE ALLOCATION

[75] Inventors: Ranga Anbil, Yorktown Heights; Francisco Barahona, White Plains, both of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/054,925

[22] Filed: Apr. 3, 1998

[51] Int. Cl.[7] .................................................. G06F 17/60
[52] U.S. Cl. ................................................................ 705/8
[58] Field of Search ........................ 705/7, 8, 9; 364/152

[56] References Cited

U.S. PATENT DOCUMENTS

| | | | |
|---|---|---|---|
| 4,744,028 | 5/1988 | Karmarkar | 705/8 |
| 4,914,563 | 4/1990 | Karmarkar et al. | 364/148.01 |
| 4,914,615 | 4/1990 | Karmarkar et al. | 708/607 |
| 4,924,386 | 5/1990 | Freedman et al. | 705/8 |
| 5,077,661 | 12/1991 | Jain et al. | 700/99 |
| 5,107,452 | 4/1992 | Karmarkar et al. | 708/607 |
| 5,115,391 | 5/1992 | Puthenpura et al. | 364/152 |
| 5,216,593 | 6/1993 | Dietrich et al. | 345/467 |
| 5,343,388 | 8/1994 | Wedelin | 705/8 |
| 5,363,388 | 11/1994 | Shi et al. | 372/20 |
| 5,408,663 | 4/1995 | Miller | 709/104 |
| 5,630,070 | 5/1997 | Dietrich et al. | 705/8 |
| 5,671,361 | 9/1997 | Brown et al. | 705/9 |
| 5,742,931 | 4/1998 | Spiegelhoff et al. | 705/8 |

*Primary Examiner*—Allen R. MacDonald
*Assistant Examiner*—Romain Jeanty
*Attorney, Agent, or Firm*—Whitham, Curtis & Whitham; Stephen C. Kaufman

[57] ABSTRACT

A method for finding fast approximations to an optimal operational state of a physical system, using an iterative procedure for converging to a solution of a Linear Program and yielding, in addition to a lower bound for an optimal cost and an approximation to the dual variables, a value representing an optimal allocation of system resources.

4 Claims, 2 Drawing Sheets

APPROXIMATION METHOD FOR EFFICIENT RESOURCE ALLOCATION

BACKGROUND OF THE INVENTION

1. Field of the Invention

The present invention generally relates to a computer-based method for resource allocation and, more particulary, to a computer-based method for efficient use of scarce resources for improved productivity.

2. Description of the Related Art

A Linear Program is a widely used method of representing and approximating a solution to resource allocation problems arising in commerce and industry. As is known to one of skill in the art, a Linear Program utilizes what are defined as admissible values for a set of variables termed "decision variables" to form a set of constraints and, further, to measure by an objective function the quality of solution that is obtained.

Two well known methods for Linear Programs are the "Simplex Method" and the "Interior Point Method". The Simplex Method has been used for approximately five decades prior to the date of the present invention, while the Interior Point Method has been used since its development by N. Karmarker in 1984. In many commercial and industrial settings, however, there is a large volume of data, and a large number of variables and constraints which, in turn, cause each of these two methods to require very large computing resources. Such resources may be impractical or unavailable, which can render these two methods not usable for such settings. Therefore, for such cases, fast approximations methods which require less computing resources are needed.

A known method for such an approximation to Linear Programs is the "Subgradient Algorithm." The Subgradient Algorithm is well known in the art and can be found in various recognized and readily available treatises. The present invention is, however, directed to this Subgradient Algorithm and, accordingly, a summary description of that algorithm will be presented below for convenience. An algorithm flow-chart of the Subgradient Algorithm is on FIG. 1 of this description.

In the first step one accepts input information describing the physical system. The input data includes a matrix A and a vector b, both of which are used to set up the constraints of the system, a row of coefficients c used to measure the quality of a set of decisions x, and a plurality of bounds u, which are used to limit the acceptable values of x. The first step then, based on the above-described input information, forms the following Linear Program:

$$\text{Minimize } cx \tag{1}$$

subject to the following:

$$Ax = b,$$
$$0 \le x \le u$$

The second step of the Subgradient Method forms a first approximation to the Linear Program by solving the following relaxed problem:

$$1 = \text{Min}(c - \pi A)x \tag{2}$$

Subject to the following:

$$0 \le x \le u$$

where $\pi$ is a set of parameters describing the importance of each constraint in A.

Under the commonly used terminology in the relevant art of linear programming, the components of the set n are called "dual variables," and the decision variables x are called "primal variables." A detailed discussion of these terms of art is not necessary for one of skill in the art to understand the present invention and, therefore, is omitted from this description. An interested reader can refer to any of several available textbooks such as, for example, G. B. Dantzig, "Linear Programming and Extensions", Princeton University Press (1963).

This second step requires as an input a first approximation to n which may, for example, be 0.

Solving the second step approximation is much easier, in terms of computational burden, than solving the original Linear Program of step one.

Let $\bar{x}$ denote the solution obtained at the end of step two. A third step then computes the following:

$$v = b - A\bar{x} \tag{3}$$

The values in v are the violations of the original constraints.

Next, a fourth step updates the vector $\pi$ using the following formula:

$$\pi \leftarrow \pi + \lambda v. \tag{4}$$

The parameter $\lambda$ is termed the "step size" and is generally set in a controllable manner by the operator. A standard method for the setting of $\lambda$ is:

$$\lambda = f(1 - Zu)/\|v\|^2 \tag{5}$$

where f is a nonnegative value less than 2, $Z_u$ is an operator-specified upper bound for the minimum in Equation (1) based on a prior knowledge, if any, and $\|v\|^2 = \Sigma v_i^2$.

The $Z_u$ upper bound, if there is prior knowledge, represents a maximum cost, i.e., a maximum resource availability for the physical system that is modeled. For example, if the objective of the linear program is to minimize a transportation cost, but one million dollars is the maximum available money resource which cannot be exceeded, then the $Z_u$ upper bound is set at one million.

In the absence of prior knowledge, however, the operator may set an arbitrary high value for $Z_u$.

As shown by FIG. 1, the Subgradient Method repeats by a main iteration loop steps two, three and four a number of times that is specified by the operator. As is well-known in the art of Linear Programming the number of iterations is specified in accordance with a predetermined maximum allowed discrepancy, the amount of computer resources that are available, and computing time limitations.

The known Subgradient Method produces a lower bound for the optimal value of cx in Equation (1) and a good approximation for the dual variables $\pi$. A drawback of this Subgradient Method, though, is that it does not produce any approximation whatsoever to the parameters x, which are the parameters that describe the required optimal state of the physical system.

SUMMARY OF THE INVENTION

It is an object of the present invention to provide a novel approximation to a Linear Program which further generates approximations for the primal decision variables x, which the conventional Subgradient Method does not generate, as well as approximations for dual variables π, in a computationally efficient and fast manner.

It is a further object of the present invention to provide fast approximation to Linear Program, with approximations to the primal decision variables x, for an optimal allocation of resources in a physical system.

BRIEF DESCRIPTION OF THE DRAWINGS

The foregoing and other objects, aspects and advantages will be better understood from the following detailed description of the preferred embodiments of the invention with reference to the drawings, in which.

DETAILED DESCRIPTION OF THE PREFERRED EMBODIMENTS OF THE INVENTION

The computer-implemented method of the present invention provides optimized resource allocation for a wide range of physical systems. A general embodiment of the method, which is termed the "volume algorithm method", will be described first, with variables and signals defined as to what general type of physical parameter, method constraint, or quality metric each represents. Embodiments will then be described in terms of specific example physical systems.

Figure 1:
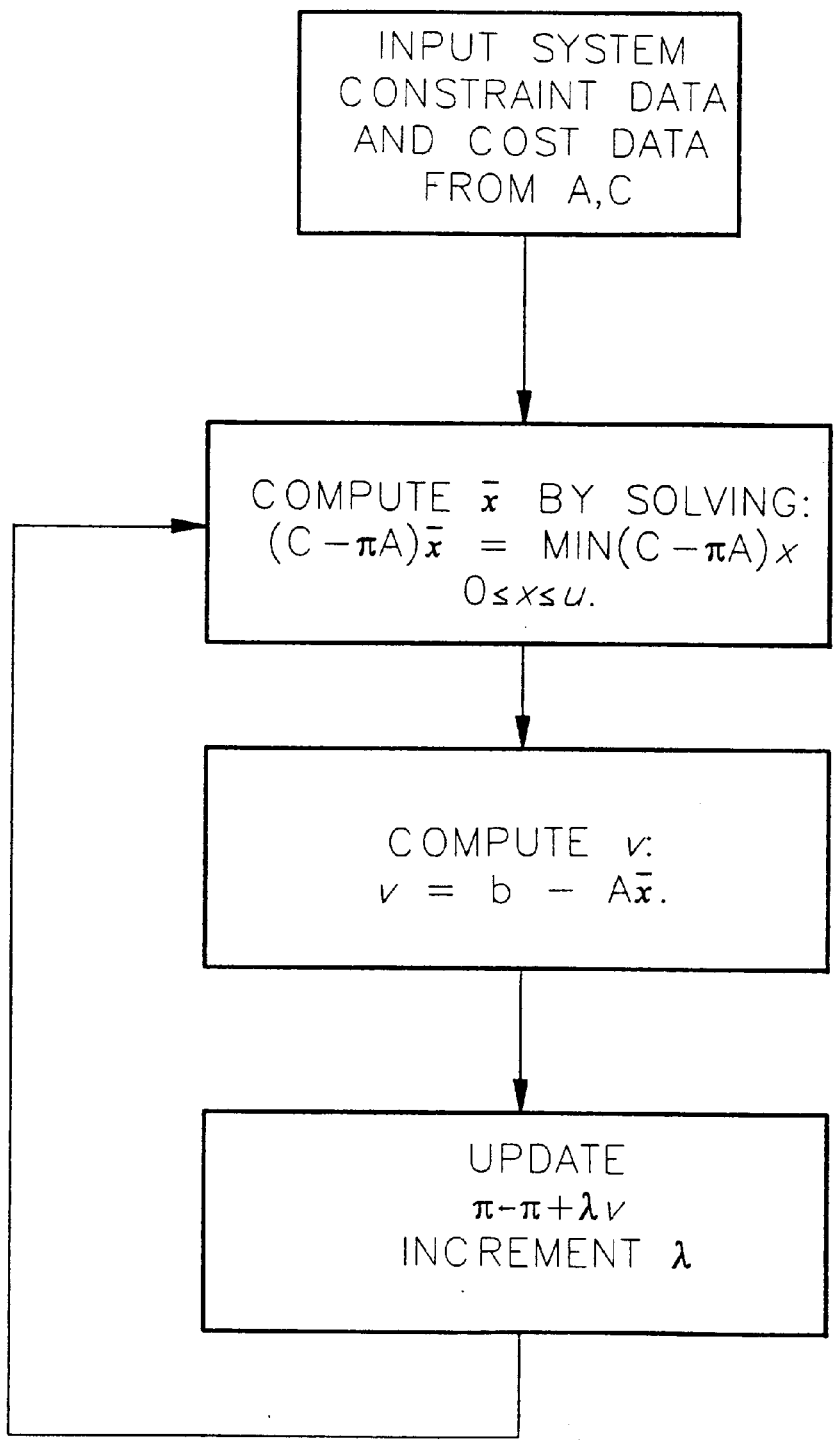
FIG. 1 is a block diagram of the conventional Subgradient Method for approximation of a Linear Program.

Referring to FIG. 1, the first step 100 is identical to step one of the prior art Subgradient Algorithm for Linear Program, which comprises input of data representing, for example, rules governing and costs associated with system vectors x of the physical system to be optimized. Next, at step 101, the dual values of $\bar{\pi}$ and the system values, or vector, x, the minimum cost z and the vector π are initialized, as well as the step size λ and the decrementing weight factor α, which are described further below. For this example embodiment both $\bar{\pi}$ and x are initialized to zero because there is no assumption of prior knowledge on which an initial estimate of the values can be based. Prior knowledge, if used, consists of either an initial best guess or a best prior observed value of, for example, a physical plant location, obtained from related empirical studies. The value z is an approximation to the minimum of the cost cx defined in Equation (1) above. The values z and the vector π are set to $-\infty$ and $\bar{\pi}$ respectively.

Steps 102 to 112, defined below, are then repeated to improve the value z and the vector π.

More specifically, at step 102, the following computation is performed by iterating the vector x through a range of permissible values from 0 to u:

$$\bar{z} = \min(c - \bar{\pi}A)x \quad (6)$$

subject to $$0 \le x \le u.$$

The results of step 102 are $\bar{x}$ and $\bar{z}$, where $\bar{x}$ is the vector x which provides the minimum shown at Equation (6). Next, at step 104, the system vector x is updated as follows:

$$x \leftarrow \alpha \bar{x} + (1-\alpha)x \quad (7)$$

For step 104, α is a decremented weighting factor, ranging between 0 and 1, which decrements in a progression selected by the system operator. A preferred progression of 0.1, 0.01, 0.001, and 0.0001 for α has worked well for the present inventors.

Next, at step 106, if $\bar{z} > z$ the values π and $\bar{z}$ are updated as follows:

$$z \leftarrow \bar{z} \quad (8.1)$$

$$\pi \leftarrow \bar{\pi}$$

and the violation vector v is computed as follows $$v = b - Ax \quad (8.2)$$

The violation vector represents a discrepancy between the physical system and the updated system vector x.

Next, at step 108, the dual variables vector $\bar{\pi}$ is computed using a step-size factor λ, as follows:

$$\bar{\pi} = \pi + \lambda v \quad (9)$$

$$\lambda = f(\bar{z} - z_u)\|v\|^2$$

where $f$ is a nonnegative value less than 2, and $Z_u$ is an upper bound for the minimum of the cost cx defined by the Linear Program of Equation (1).

The following expression represents the system vector x resulting from n iterations through steps 102, 104, 106 and 108:

$$x = \alpha_n^n + (1-\alpha_n)\alpha_{n-1}^{n-1} + \quad (10)$$

$$(1-\alpha_n)(1-\alpha_{n-1})\ldots(1-\alpha_2)\alpha_1^1$$

with $^i$ being the value of x calculated at the ith iteration of step 102, for that iteration, equation (6), and $\alpha_1, \ldots, \alpha_n$ being the predetermined decrementing sequence of the parameter α shown in step 104.

Figure 2:
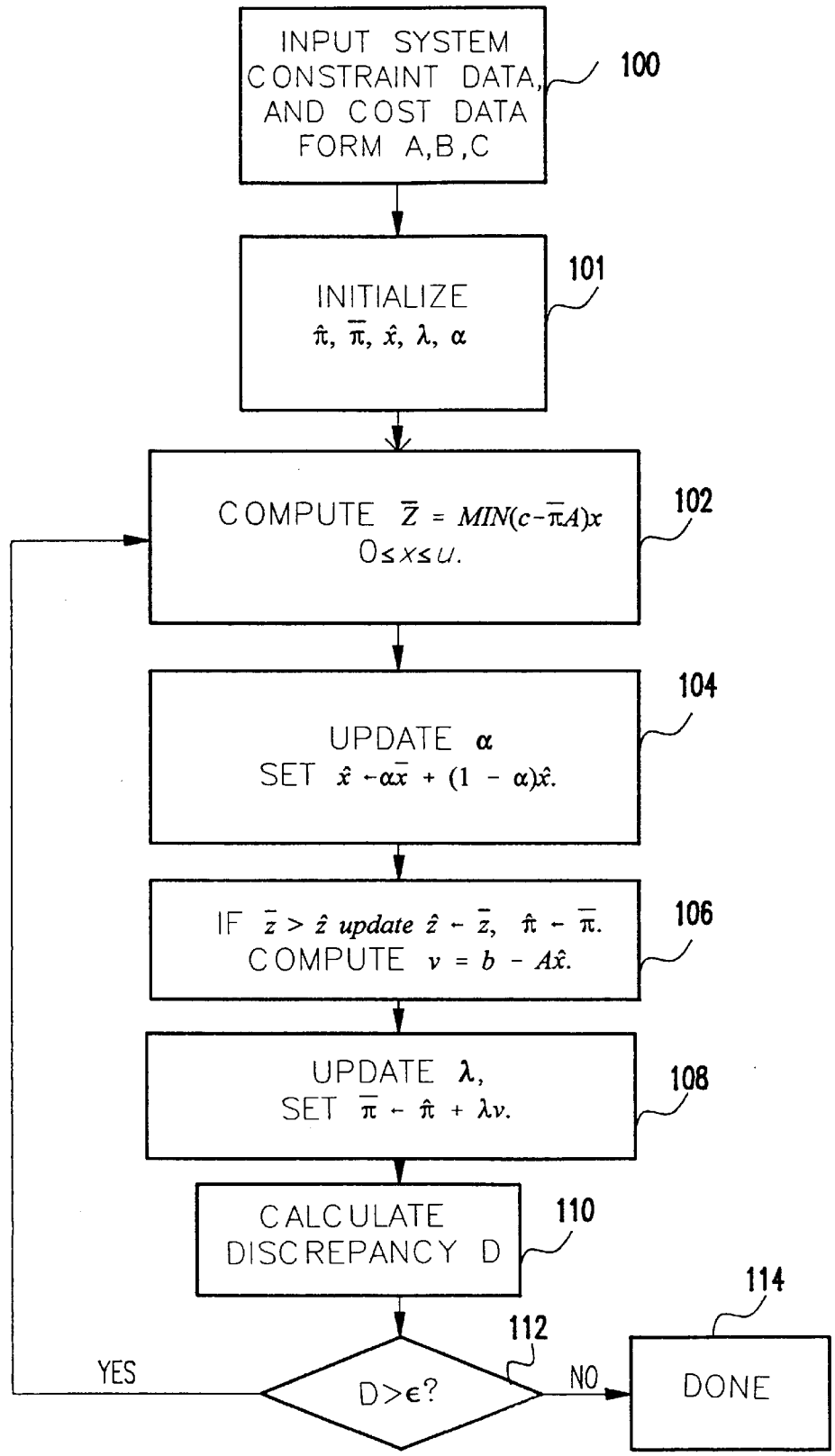
FIG. 2 is an example block flow chart of a computer-based approximation method according to the present invention.

As can be seen by one of ordinary skill, the expression (10) above, if repeated an infinite number of times, converges to an optimal solution of the Linear Program shown as Equation (1) above. In practice, however, the number of iterations n is a finite number and, therefore, x will be an approximation to the optimal solution of Equation (1). The discrepancy of x with respect to the physical system incrementally decreases with each incremental increase in n. Step 110 shown on FIG. 2 calculates this discrepancy, termed D, after each iteration as follows:

$$D = \Sigma |v_j| \quad (11)$$

where $v_j$ is the jth component of the violation vector v defined at equation (8) as calculated by the ith iteration of step 106. To determine the value of n, therefore, a predetermined level, termed ε, is given for the discrepancy D. The present inventors have identified as a good value for e the value 0.01 m, where m is the number of rows of the matrix A defined above. As shown at FIG. 2, method step 112 compares the calculated discrepancy D with the predetermined level ε and, if D>ε, loops back to block 106. If D is less than ε, the process ends at step 114.

It will be noted that although steps 102, 106 and 108 described above have components comparable in limited aspects to the steps of the prior art Subgradient Method, that step 104 of this invention is a major addition to, and effects a substantive improvement in operation over that prior art method.

Because of its simplicity as compared to the Interior-point method and the Simplex method of the prior art, each iteration of the above-described method is extremely fast.

The above-described embodiment can be readily implemented on a standard Pentium® or Power PC™-type, or equivalent microprocessor-based personal computer, or on a workstation such as, for example, an IBM RS 6000, with a standard random access memory (RAM) capacity of, for example, 64 Megabytes. For comparison, the Airline Crew Problem of the example embodiment described further below, which required 64 Megabytes to optimize aircraft crew assignments for major U.S. airline carries, requires up to 512 Mega bytes when implemented by the prior art methods.

A second embodiment (not shown) further exploits features the present invention by employing a plurality of M identical hardware blocks (not shown), where M is the number of components in the vector $\bar{x}$, each block operating independently to calculate a corresponding one of the components of that $\bar{x}$ vector. Each hardware block can be realized by an entire application specific integrated circuit (ASIC), a block within an ASIC containing one of the M blocks on a single chip, or by a general-purpose programmable block of a parallel-processor machine such as, for example an IBM RISC System/6000 Scalable POWERparallel Systems SP2.

Another embodiment (not shown) distributes the computation of step 106 to a plurality of Q independent hardware blocks (not shown), such that each row of the A matrix is computed independently.

As described above, step 102 sets the initial value of the dual values of $\bar{\pi}$ and the system values, or vectors, x to zero because, for that particular embodiment, there is no assumption of having prior knowledge of the parameters describing the importance of each constraint in the A matrix, or of an initial estimate of an optimal resource allocation decision x. An alternative embodiment uses a modified version (not shown) of step 101 which sets the initial values of the dual values of $\overline{90}$ and the system vectors x to a best estimated value based on, for example, empirical data.

It should be noted that the ordering of the labeled method blocks of FIG. 2, and the distribution and arrangement of operations within the labeled blocks, is for purposes of example only and that numerous variations are readily seen by one of ordinary skill. For example, method block 110, which calculated the discrepancy D can be merged into method block 106, which calculated the violation vector v upon which the discrepancy vector is based. Further, the decision block 112 could be located between blocks 106 and 108, since the violation vector v formed the discrepancy D which, in turn, controls the loop decision of block 112. Still further, the initialization operations shown at block 101 could be distributed into the remaining processing blocks, utilizing, for example, a flag (not shown) disabling the initialization after the first iteration.

Example Embodiment

An example embodiment of the volume algorithm method of the present invention is directed to solving an optimization problem for selection of aircraft crews for commercial airline systems. The specific example problem is termed the Airline Crew Scheduling problem. The Airline Crew problem is an important optimization problem because airlines typically incur crew costs equaling approximately ten percent of their total revenue. Therefore, even a small improvement in crew utilization can result in significant cost reduction.

The Airline Crew problem is defined as:

minimize cx (12)

Ax=1 x≧0, where x is an allocation of crew to flights, cx is the crew costs which is to be minimized, and the system Ax=1 defines the set of possible crew allocations. Equation (12) is a specific form of the Linear Program of Equation (1), with all values of the Equation (1) vector b taking the value of one.

The number of possible crew assignments Ax analyzed by this example embodiment is greater than one billion. The columns of λ correspond to crew trips and the rows correspond to flights that have been covered. The data representing the Airline Crew Problem are:

the flight schedule for a full month with as many as 100,000 flights for the major U.S. carriers a large set of various rules, including FAA regulations that define feasible and safe crew assignments pay rates as agreed between airlines and crew unions Flights are associated with the rows of A, and crew assignments define the columns of A. Pay rates are used to compute the vector c.

The above-described information is input at step 100 to set up the particular Linear Program defined by Equation (12). The objective is to find the specific value of the allocation x that minimizes the crew cost cx. The problem was solved using the above-described steps 102–112 as follows:

The variables $\bar{\pi}$ and $\bar{x}$ denote row vectors that have one entry for each flight. The variable x denotes a vector that has one entry for each column of A, and start with x=0. At this example's execution of step 101 the initial values of $\bar{x}$ and $\bar{\pi}$ are set equal to 0 and the initial value of z is set=0.

The example execution of step 102 then computes the set of reduced costs $\bar{c}$ as:

$$\bar{c} = c - \bar{\pi}A.$$

For each crew trip j the value of $\bar{c}_j$ is checked. If $\bar{c}_j<0$, the trip is defined as a candidate by setting the value of $\bar{\pi}_j=1$. If $\bar{c}_j$ is $\geq 0$ then the trip is defined as a non-candidate by setting the value of $\bar{x}_j=0$. The result is a candidate allocation $\bar{x}$. These values correspond to what is obtained when the FIG. 2 step 102 is applied to this particular problem.

Next, at execution of step 104, x is updated as:

$$x \leftarrow \alpha \bar{x} + (1-\alpha \bar{x}),$$

where α is a number between 1 and 0 controlled by the system operator.

The next step is the execution of step 106 of FIG. 2 which calculates a lower bound of the minimum cost as:

$$\bar{z} = c\bar{x} + \pi 1$$

If $\bar{z}>z$, then π and z are updated as follows:

$z \leftarrow \bar{z}$ $\pi \leftarrow \bar{\pi}$ and then the violation vector is computed as:

$$v = 1 - Ax.$$

These values correspond to what is obtained when the FIG. 2 step 106 is applied to this particular problem.

As can be seen, for each flight i, $v_i$ is one minus the number of times that the flight is being covered by the vector $\bar{x}$. Next, in accordance with step 108 of FIG. 2, an updated vector $\bar{\pi}$ is computed as:

$$\bar{\pi}\pi+\lambda v_i$$

where $\lambda$ is a step size defined by Equation (9).

For this example, $\lambda$ is computed according to Equation (5). $Z_u$ is estimated based on past experience which, for this example, is the cost of a crew schedule of a previous planning cycle.

With the new vector $\bar{\pi}$, the method returns to step 102 and repeats the cycle. The procedure is iterated until:

$$(|z - cx|/z) < 0.01$$

and $\|v\|$ is less than a predefined tolerance, as described above. The output of this example method is an approximation of the minimum cost allocation of crew to given flights.

As an example to show the processing speed improvement obtained with the present invention, the Airline Crew Problem was run using the prior art Simplex and Interior-point algorithms on an IBM RS 6000 workstation. The processing time was more than twenty-four CPU hours. The volume algorithm method of the present invention, implemented on the same workstation, reached a solution in less than one half the time.

Further, the volume algorithm method of the present invention is much simpler computationally and, accordingly, requires substantially less memory. More particularly, the Simplex and Interior-point algorithms require up to 512 Mega bytes of working memory for the Airline Crew problem for major U.S. carriers. The volume algorithm method of the present invention, however, can run within a 64 Mega byte memory.

Further, the volume algorithm method of the present invention lends itself to parallel processor implementation much better than the Simplex and Interior-point methods of the prior art.

The Airline Crew problem is by no means the only physical system optimization problem solvable by the present invention. On the contrary, the volume algorithm method of this invention is a computationally efficient method for a variety of optimization problems arising in commerce and industry where resources are scarce and costs and revenues must be improved. Specific examples include machine scheduling and sequencing in the manufacturing sector, network utilization in the telecommunications industry, and the logistics of transporting and warehousing in the retail industry.

While the invention has been described in terms of its preferred embodiments, those skilled in the art will recognize that the invention can be practiced with modification within the spirit and scope of the appended claims.

Having thus described our invention, what we claim as new and desire to secure by Letters Patent is as follows:

1. A computer-implemented method for optimizing an allocation of resources in a product/services distribution system in order to reduce costs, comprising steps of:

inputting a first data representing physical constraints of said product/services distribution system;

forming a first matrix and a first vector in a memory of a computer based on said first data;

inputting a quality vector associated with a decision vector;

initializing a first minimum cost value, a decision vector representing a vector state of said physical system, an optimal decision vector representing a vector state of said product/services distribution system, a first dual variables vector, a second dual variables vector, a weighting factor and a step-size, each to a respective predetermined initial value;

computing a second minimum cost value and an intermediate optimal decision vector, in accordance with the following:

$$\bar{z}=\min(c-\bar{\pi}A)x$$

subject to $$0 \leq x \leq u,$$

where $\bar{z}$=the computed second minimum cost value,
c=said quality vector,
$\bar{\pi}$=said second dual variables vector,
A=said first matrix,
x=equal to said decision vector,
u=a predetermined range of permissible values for the decision vector, and
$\bar{x}$=the computed intermediate optimal decision vector, which is equal to the decision vector resulting in said second minimum cost value;

updating the optimal decision vector, in accordance with the following:

$$\hat{x} \leftarrow \alpha\bar{x}+(N-\alpha\hat{x}),$$

where $\hat{x}$=a previous value of said optimal decision vector,
$\alpha$=said weighting value,
N=a predetermined value, and
$\hat{x}$=the computed value of said optimal decision vector;

conditionally updating the first intermnediate cost and the second dual variables vector, in accordance with the following:

if $\bar{z}>\hat{z}$, then $\hat{\pi} \leftarrow \bar{\pi}$ and $\hat{z} \leftarrow \bar{z}$,
else do not update said first intermediate cost and said second dual variables vector, where
$\hat{\pi}$=the updated updated dual variables vector,
$\hat{z}$=a previous value of the first intermediate cost, and
$\hat{z}$=the updated first intermediate cost;

calculating a violation vector v, in accordance with v=b−A$\hat{x}$, where b=said first vector;

updating the first dual variables vector, according to the following:

$$\bar{\pi}=\hat{\pi}+\lambda v_i$$

where $\lambda$=a step-size parameter;

updating the step-size parameter based on at least one of the second minimum cost value and the violation vector v;

decrementing the weighting factor by a predetermined decrementing factor;

calculating a discrepancy value, representing a discrepancy of the optimal decision vector with respect to said physical system, based on a magnitude of said violation vector v;

repeating said steps of computing a second minimum cost value and an intermediate optimal decision vector, updating the optimal decision vector, conditionally updating the first intermediate cost and the second dual variables vector, calculating a violation vector v, updating the first dual variables vector, updating the step-size parameter, decrementing the weighting factor, and calculating a discrepancy value until the discrepancy value is less than a predetermined acceptance level, and allocating resources in said product/services distribution system in accordance with the optimal decision vector that exists when said discrepancy value is calculated to be less than said predetermined acceptance level, said allocating step optimizing allocation of said resources in said product/services distribution system in a manner that reduces costs in said system.

2. A method for optimizing an allocation of resources according to claim 1, further comprising the step of inputting a data representing an upper bound on the first minimum cost value.

3. A method for optimizing an allocation of resources according to claim 2, wherein said step of updating the step-size parameter is further based on a difference between the second minimum cost value and the data representing an upper bound on the first minimum cost.

4. A method for optimizing an allocation of resources according to claim 1, wherein said predetermined value N is equal to unity.

* * * * *